(12) United States Patent
Fetzmann et al.

(10) Patent No.: US 7,772,992 B2
(45) Date of Patent: *Aug. 10, 2010

(54) METHOD AND DEVICE FOR ASSISTING THE GROUND NAVIGATION OF AN AEROPLANE IN AN AIRPORT

(75) Inventors: Fabien Fetzmann, Cugnaux (FR); Pierre Coldefy, Toulouse (FR); Stephane Collins, Toulouse (FR)

(73) Assignee: Airbus France, Toulouse (FR)

( * ) Notice: Subject to any disclaimer, the term of this patent is extended or adjusted under 35 U.S.C. 154(b) by 451 days.

This patent is subject to a terminal disclaimer.

(21) Appl. No.: 11/910,401

(22) PCT Filed: Mar. 29, 2006

(86) PCT No.: PCT/FR2006/000670

§ 371 (c)(1),
(2), (4) Date: Oct. 1, 2007

(87) PCT Pub. No.: WO2006/106210

PCT Pub. Date: Oct. 12, 2006

(65) Prior Publication Data

US 2008/0186207 A1     Aug. 7, 2008

(30) Foreign Application Priority Data

Apr. 4, 2005    (FR) .................................. 05 03269

(51) Int. Cl.
*G08G 5/04*    (2006.01)

(52) U.S. Cl. .......................... 340/961; 340/958; 701/120
(58) Field of Classification Search ................. 340/958, 340/983, 945, 961; 701/120
See application file for complete search history.

(56) References Cited

U.S. PATENT DOCUMENTS

| 4,646,244 A | 2/1987 | Bateman et al. |
| 7,499,795 B2 * | 3/2009 | Fetzmann et al. ........... 701/120 |

FOREIGN PATENT DOCUMENTS

WO       03/005326       1/2003

OTHER PUBLICATIONS

PCT International Search Report dated Jul. 19, 2006.

* cited by examiner

*Primary Examiner*—Jeffery Hofsass
(74) *Attorney, Agent, or Firm*—Dickinson Wright PLLC

(57) ABSTRACT

The invention relates to a device (1) comprising a set (2) of information sources for determining the active values of a plurality of parameter of an aeroplane, calculating means (3) for determining, by means of said active values, a first position corresponding to a position which is extrapolated from the nose of the aeroplane following a particular time interval from the current instant. The inventive device also comprises a database (5) provided with at least one pre-determined unauthorized zone of the airport, comparison means (6) for comparing said first position to said pre-determined unauthorized zone of the airport, and warning means (9) for emitting at least one warning signal if the first position is located in the unauthorized zone.

17 Claims, 3 Drawing Sheets

Figure 1:
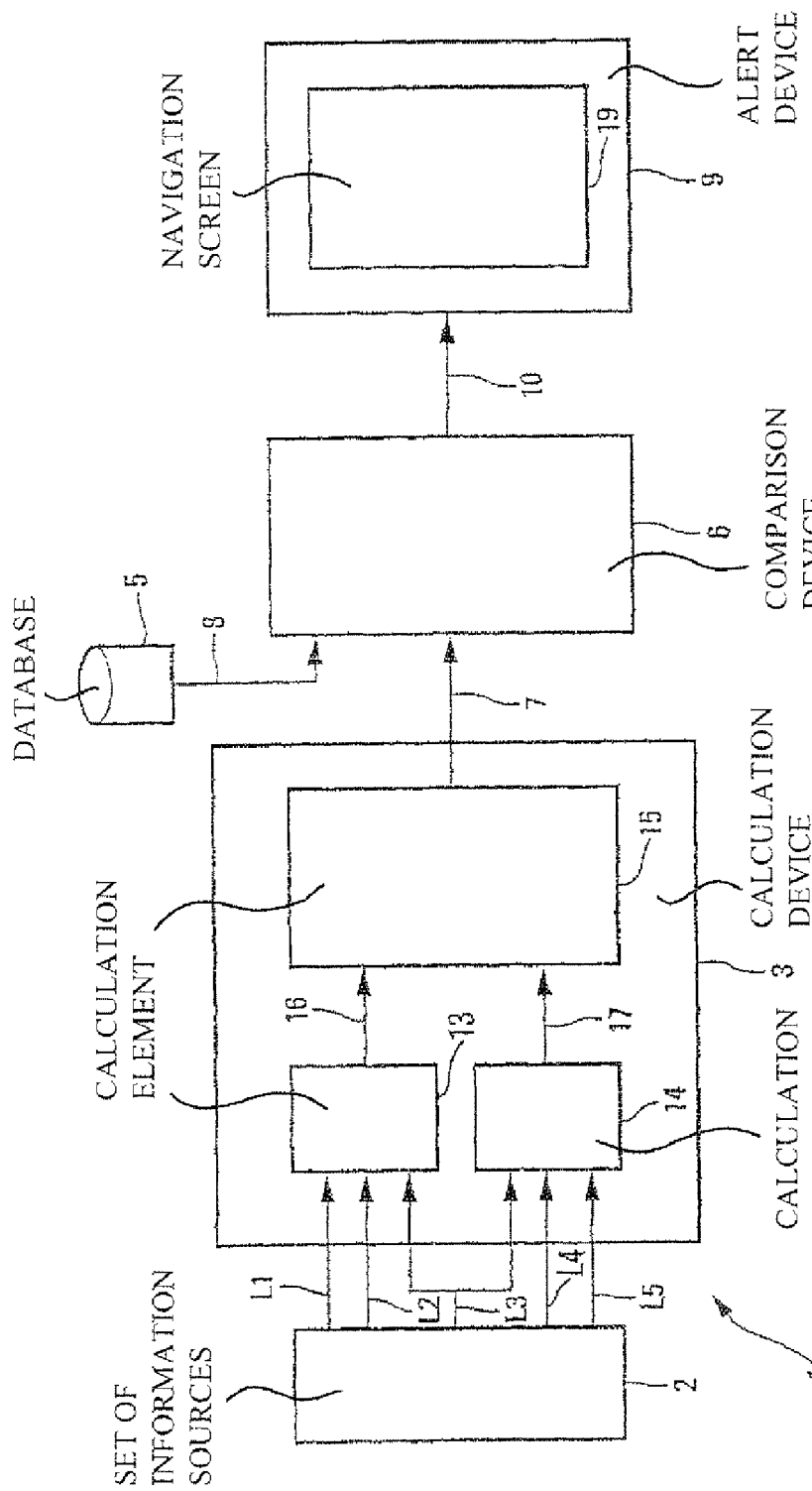

METHOD AND DEVICE FOR ASSISTING THE GROUND NAVIGATION OF AN AEROPLANE IN AN AIRPORT

The present invention relates to a method and a device for aiding the ground navigation of an airplane in an airport.

The complexity of certain airports, the increase in air traffic and the existence of installations that are often hardly suitable for ever bigger and more numerous airplanes, create difficulties of flow on the runways and taxiways of airports, thereby often giving rise to lengthier periods of taxiing, sometimes more or less serious incidents and unfortunately also accidents.

In this context, an ever higher number "of runway incursions" are noted, that is to say situations where a nonauthorized airplane penetrates onto a runway which is being used at the same moment in a regular manner by another airplane, to land or take off. Such a runway incursion is very dangerous, since it endangers the life of the occupants of the two craft.

For safety reasons, it is therefore important, or indeed obligatory, that each pilot be able to monitor as effectively as possible the environment around his airplane and if appropriate be informed of any runway incursion (or of any risk of incursion).

Document EP-0 980 828 discloses a system which is carried aboard an airplane, for assisting the pilot of the airplane during maneuvers on the ground. For this purpose, this system comprises a first camera which produces video images of the front landing gear and of a zone around the latter, a second camera which produces video images of the main landing gear and of zones therearound, and viewing means which are mounted in the flight deck and which display the video images produced by said first and second cameras (which are fixed to the fuselage).

This known system provides the pilot only with the information which allows him to make maneuvers while taxiing on the ground with increased safety. In particular, through the observation of the landing gear and of the zones therearound, he can prevent the gear from hitting an obstacle on the ground or from leaving the runway or the taxiway, on which the airplane is traveling. However, this known system does not provide any information on the whole (or at the very least an extended zone) of the runway or of the taxiway. Now, such a lack of information can be dangerous, in particular in bad visibility (fog, etc.). Specifically, another craft, in particular another airplane, may be located on the same runway (or the same taxiway) at the same moment and, through lack of information, it may happen that a collision cannot be avoided, in particular if the other craft has a very high speed such as exists on takeoff or landing of an airplane for example.

Moreover, a viewing system allowing the aforesaid drawbacks to be partially remedied is known through an article by Beskenis, Green, Hyer and Johnson entitled "Integrated Display System for Low Visibility Landing and Surface Operations" published in the publication "NASA Langley Technical Report", July 1998, NASA/CR-1998-208446. This viewing system comprises, in particular, viewing means making it possible to present on a screen mounted in the flight deck of the airplane a map of the airport showing the runways, the taxiways and the various buildings, as well as the position of the airplane and the traffic which exists on this airport.

However, monitoring carried out with the aid of such a viewing screen assumes that the pilot looks at said viewing screen very often and in a regular manner. Moreover, even by monitoring the viewing screen, it will be difficult for him to detect in advance a risk of intrusion onto a runway with the aid of a map of the airport, since the future position of the airplane depends on characteristics of said airplane, such as its speed or its direction of taxiing, that it is difficult for a pilot to evaluate by looking at such a viewing screen.

The present invention is aimed at remedying these drawbacks. It relates to a method of aiding the ground navigation of an airplane in an airport, which makes it possible to inform the pilot of any risk of incursion of the airplane into a prohibited zone.

For this purpose, according to the invention, said method is noteworthy in that the series of following successive steps is carried out, in an automatic and repetitive manner:

a) the current values of a plurality of parameters of said airplane are determined;

b) with the aid of said current values, a first position corresponding to an extrapolated position of the nose of said airplane after a particular time interval starting from the current instant is determined;

c) this first position is compared with at least one predetermined prohibited zone of the airport; and d) if said first position is situated in said prohibited zone, at least one alert signal is emitted.

Thus, by virtue of the invention, any risk of incursion of the airplane into a prohibited zone (specified below) of the airport, that is to say any excessive approach to a prohibited zone such as this, is indicated by the emission of an alert signal. Consequently, the pilot of the airplane is always alerted upon the occurrence of such a risk of runway incursion, and he can then implement all the appropriate means necessary to prevent any undesired incursion, thereby affording a valuable aid to safety during airport navigation.

Moreover, by virtue of the repetitive and automatic implementation of the method in accordance with the invention, which is therefore permanent and does not require any action on the part of the pilot, the latter can focus all his attention on other tasks, in particular piloting tasks.

In a preferred embodiment, to determine said first position:
a predetermined reference point of the airplane is taken into account;
in step a), we measure:
  the current position of said reference point;
  the current speed of said reference point;
  the current direction of the airplane (namely the heading of the airplane or a GPS direction specified hereafter); and
  the current yaw rate of the airplane; and
in step b), successively:
  with the aid of the current position of said reference point, of the current direction of the airplane and of a (predetermined) vector offset between the nose of the airplane and said reference point, the current position of the nose of the airplane is determined;
  with the aid of the current speed of said reference point, of the current yaw rate of the airplane and of the (predetermined) vector offset between the nose of the airplane and said reference point, the current speed of the nose of the airplane is determined; and
  with the aid of said current position and current speed thus determined of the nose of the airplane, as well as said particular time interval, said first position is determined which therefore corresponds to an extrapolated position of the nose of the airplane at the conclusion of said time interval.

In an advantageous manner, said reference point corresponds to the location of the airplane where a reception antenna of a satellite-based positioning system is installed, in particular of GPS type ("Global Positioning System").

In a particular embodiment, in step c), said first position is compared with a plurality of predetermined prohibited zones which are grouped together in a List of prohibited zones. Within the framework of the present invention, said list of prohibited zones can comprise:

- at least one runway zone which corresponds to a surface of the airport, defined around a travelway of said airport, for example a landing runway, a taxiway or an access linkway; and/or
- at least one auxiliary zone which corresponds to a surface of the airport, defined around a stop bar of said airport.

The term stop bar is understood to mean a transverse painting on the taxiways on the approach to the runways. There are CAT I stop bars (150 m from the runway) and CAT III stop bars (90 m from the runway). When luminous beaconing is activated by bad visibility at the level of this stop bar, it becomes a stop (or "stop bar"). The pilot must systematically come to a brief stop at the level of the stop bars and request authorization from traffic control to proceed.

In a particular embodiment, the set of steps b) c) and d) is implemented only if the current speed of a reference point of the airplane is greater than a first limit speed and less than a second limit speed.

Furthermore, advantageously, said particular time interval corresponds:

- to a predetermined time interval T1, for example seven seconds, if the current speed Va of a reference point of the airplane is greater than or equal to a third limit speed Vs3; and
- to a time interval T2 satisfying the expression T2=(Vs3.T1)/Va, if said current speed Va is less than said third limit speed Vs3.

Within the framework of the present invention, it is possible to emit any type of alert signal in step d) upon the detection of a risk of incursion into a prohibited zone, in particular an audible alert signal and/or a visual alert signal.

In a preferred embodiment, in step d), a visual alert signal is emitted on a standard navigation screen. In this case, advantageously, said visual alert signal corresponds:

- to the highlighting on the navigation screen of a corresponding runway, if said prohibited zone represents a runway zone; and/or
- to a textual message which is displayed on said navigation screen.

In the latter case, in an advantageous manner, the display zone of said textual message depends on the display mode (for example a mode rose, plane or arc) existing at the moment of the display on said navigation screen.

Furthermore, advantageously, said textual message comprises the name of the corresponding runway if said prohibited zone represents a runway zone defined around a landing runway, this name comprises two attributes the position of one of which with respect to the other indicates the side of the runway by which the airplane arrives, and this side is determined with the aid of an orientation of the speed vector of the nose and of an orientation (which is predetermined) of said runway.

The present invention relates also to a device for aiding the ground navigation of an airplane in an airport.

According to the invention, said device is noteworthy in that it comprises:

- a set of information sources for determining the current values of a plurality of parameters of said airplane;
- calculation means for determining, with the aid of said current values, a first position corresponding to an extrapolated position of the nose of said airplane after a particular time interval starting from the current instant;
- a database comprising at least one predetermined prohibited zone of the airport;
- comparison means for comparing said first position with said predetermined prohibited zone of the airport; and
- alert means for emitting at least one alert signal if said first position is situated in said prohibited zone, said alert means comprising in particular a cockpit display screen, for example of ND type or of OIT type.

The figures of the appended drawing will clearly elucidate the way in which the invention may be embodied. In these figures, identical references designate similar elements.

FIG. 1 is the schematic diagram of a device in accordance with the invention.

Figure 2:
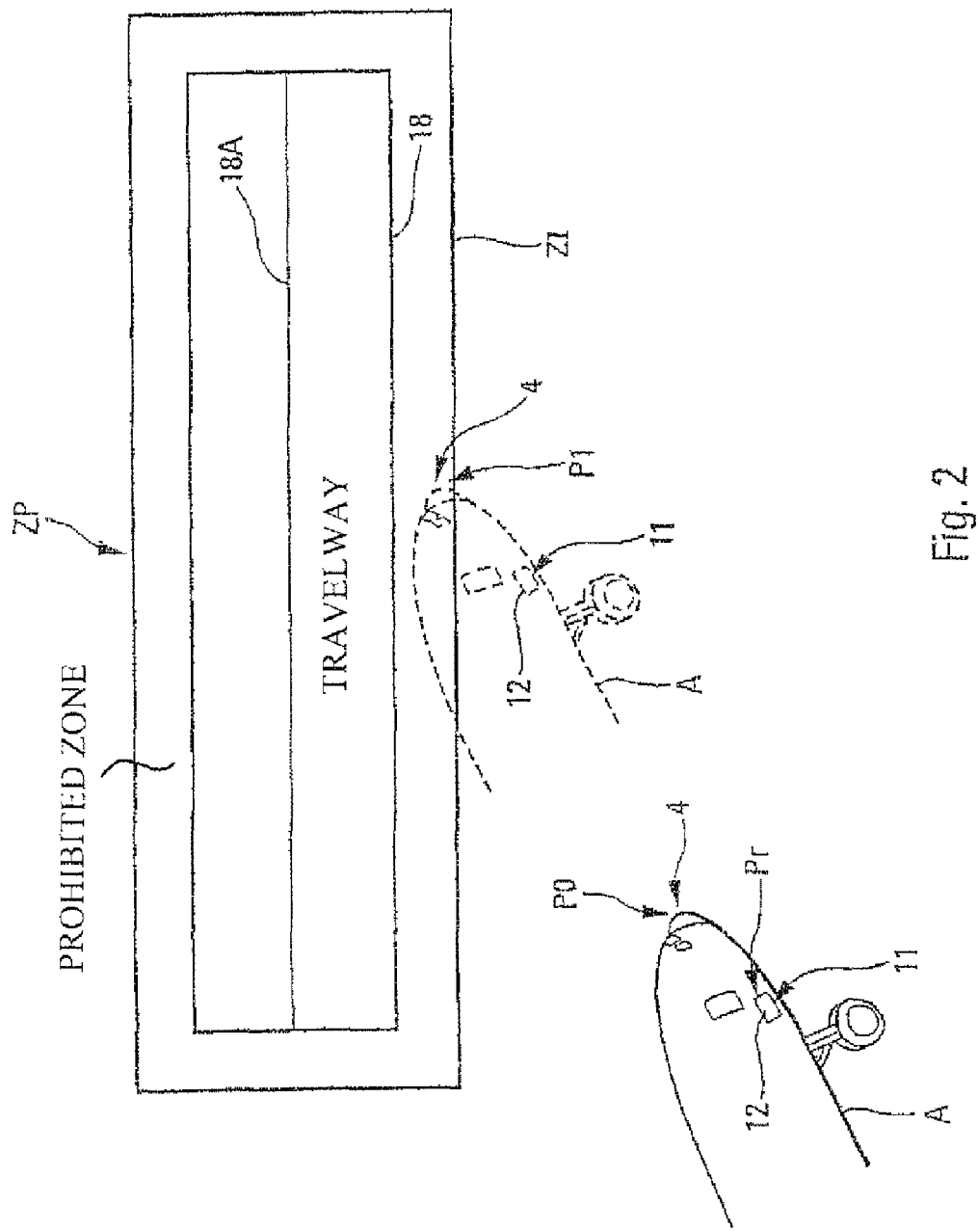

FIG. 2 diagrammatically illustrates the mode of determination in accordance with the invention of a risk of runway incursion.

Figure 3:
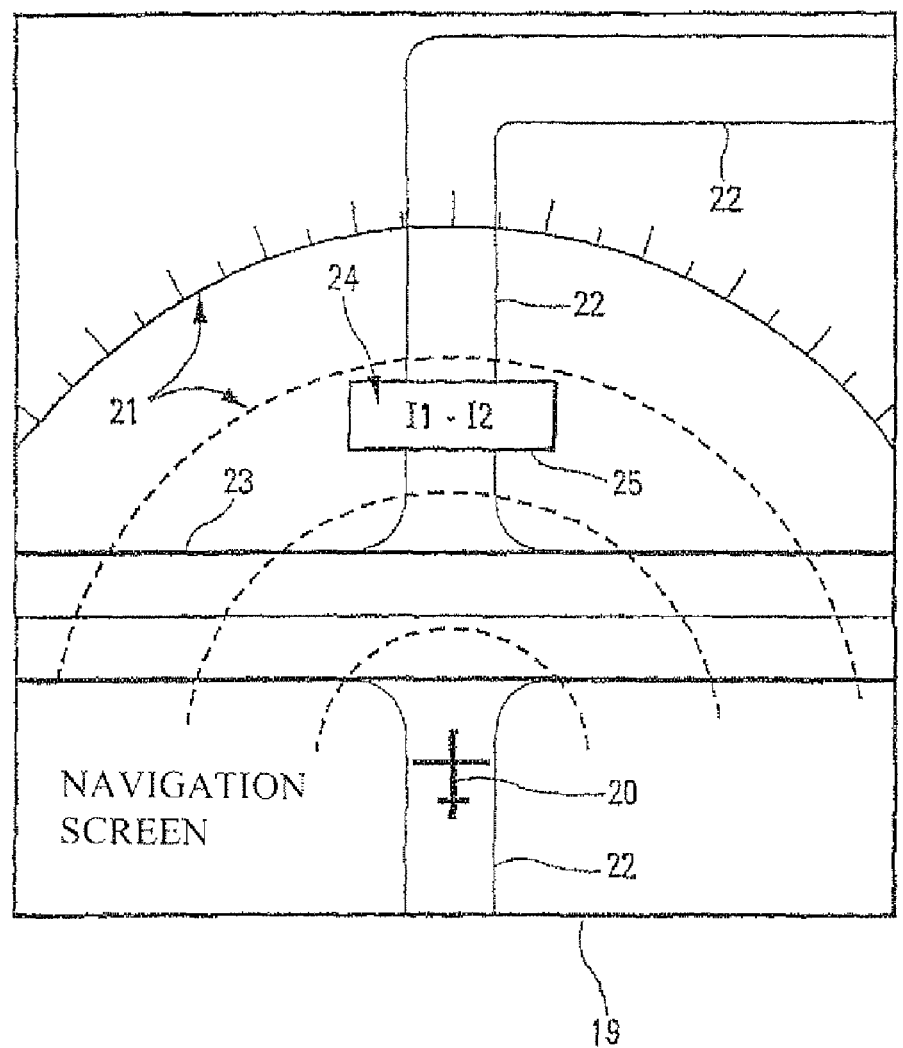

FIG. 3 diagrammatically shows an exemplary presentation of a visual alert signal.

The device 1 in accordance with the invention and diagrammatically represented in FIG. 1 is intended to help a pilot of an airplane A, for example of a transport airplane, which has been partially represented in FIG. 2, during the ground navigation of said airplane A in an airport. More precisely, said device 1 is aimed at informing the pilot of any risk of incursion of the airplane A into a prohibited zone Zl specified hereafter.

According to the invention, said device 1 comprises:

- a set 2 of information sources specified below, for determining the current values of a plurality of parameters of said airplane A, also specified below;
- calculation means 3 for determining, with the aid of said current values provided by said set 2 of information sources, an extrapolated position P1 of the nose 4 of the airplane A (which is represented dashed in FIG. 2 for this position). This extrapolated position P1 is attained after a particular time interval (specified below) starting from the current position PO at the current instant of the nose 4 of the airplane A (which is represented by a solid line in FIG. 2 for this position);
- a database 5 specified hereafter, which comprises at least one predetermined prohibited zone Zl of the airport in which said airplane A is traveling;
- comparison means 6 which are connected by way of links 7 and 8 respectively to said calculation means 3 and to said database 5, for comparing said extrapolated position P1 received from said calculation means 3 with said prohibited zone Zl received from said database 5; and
- alert means 9 which are connected by a link 10 to said comparison means 6, for emitting at least one alert signal, as soon as said extrapolated position P1 penetrates into said prohibited zone Zl.

Thus, by virtue of the device 1 in accordance with the invention, any risk of incursion of the airplane A into a prohibited zone Zl (specified below) of the airport, that is to say any excessive approach to a prohibited zone Zl such as this, is indicated to the pilot by the emission of an alert signal. Consequently, the pilot of the airplane A is always alerted during the occurrence of such a risk of runway incursion, and he can therefore implement all the appropriate means necessary for preventing any undesired incursion, thereby affording a valuable aid to safety during airport navigation.

Moreover, said device 1 is automatic and the above processings are carried out in a repetitive manner. The implementation of the device 1 does not therefore require any action on the part of the pilot. Also, the pilot can focus all his attention on other tasks, in particular piloting tasks, during airport navigation.

Said set 2 of information sources comprises standard means for determining the parameters used by the calculation means 3, namely:

- the current position Pr of a predetermined reference point 11 of the airplane A. Preferably, said reference point 11 corresponds to the location of the airplane A where a standard reception antenna 12 of a satellite-based positioning system is installed, in particular of GPS type ("Global Positioning System"). This position is therefore determined in this case with the aid of standard measurement means which are also mounted on the airplane A and which are associated with said reception antenna 12;
- the current direction of the airplane A which corresponds either to the heading of the airplane A which is measured by a standard means, or to the direction of said airplane A which is determined with the aid of said satellite-based positioning system;
- the current speed of said reference point 11, namely in the example of FIG. 2, the speed of the antenna 12 (norm and direction); and
- the current yaw rate of the airplane A, which is measured with the aid of a standard means.

The set 2 of information sources can also ascertain the value of the vector offset between the nose 4 of the airplane A and said reference point 11. The latter information can however also be integrated directly within the calculation means 3.

According to the invention, said calculation means 3 comprise, as represented in FIG. 1:

- a calculation element 13 which is connected by way of links L1, L2 and L3 to said set 2 of information sources and which is formed so as to determine the current position PO of the nose 4 of the airplane A, with the aid of the current position Pr of said reference point 11, of the current direction of the airplane A and of the vector offset between the nose 4 of the airplane A and said reference point 11, received respectively by way of said links L1, L2 and L3;
- a calculation element 14 which is connected by way of links L3, L4 and L5 to said set 2 of information sources and which is formed so as to determine the current speed of the nose 4 of the airplane A, with the aid of the current speed of said reference point 11, of the current yaw rate of the airplane A and of said vector offset between the nose 4 of the airplane A and said reference point 11, received respectively by way of said links L4, L5 and L3; and
- a calculation element 15 which is connected by way of links 16 and 17 respectively to said calculation elements 13 and 14 and which is formed so as to determine, with the aid of said current position and current speed received from said calculation elements 13 and 14, as well as with the aid of said particular time interval, said position P1 which therefore corresponds to an extrapolated position of the nose 4 of the airplane A at the conclusion of said time interval if the airplane A continues to taxi with its current taxiing characteristics (direction and rate of yaw).

In a particular embodiment, said particular time interval corresponds:

- to a predetermined time interval T1, for example 7 seconds, if the current speed Va of a reference point (for example of said reference point 11) of the airplane A is greater than or equal to a limit speed Vs3, for example 0.2 kt (knots) [about 0.1 m/s]; and
- to a time interval T2 satisfying the expression $T2 = (Vs3 \cdot T1)/Va$, if said current speed Va is less than said limit speed Vs3.

The preceding comparison and the determination of said particular time interval are implemented by said calculation means 3.

Within the framework of the present invention, account is also taken of limit speeds Vs1 and Vs2 which are such that:

- when the speed of the airplane A is below (or equal to) this limit speed Vs1, for example 0.2 kt (about 0.1 m/s), no alert signal is emitted by the alert means 9, in the event of detection of a risk of incursion of the airplane A into a prohibited zone Zl;
- when the speed of the airplane A is above (or equal to) this limit speed Vs2, for example 80 kt (about 40 m/s), said airplane A is no longer considered to be taxiing and the device 1 in accordance with the invention therefore no longer applies.

In general, each airport comprises a plurality of prohibited zones Zl whose coordinates are all integrated within the database 5. Within the framework of the present invention, a prohibited zone Zl can correspond to:

- a runway zone ZP such as represented in FIG. 2, which corresponds to a surface of the airport, which is defined around a travelway 18 (of which the central axis 18A has also been represented), for example a landing runway, a taxiway or an access linkway; or
- an auxiliary zone, not represented, which corresponds to a surface of the airport, which is defined around a stop bar of said airport. Stop bar is understood to mean transverse painting on the taxiways on the approach to the runways. There are CAT I stop bars (150 m from the runway) and CAT III stop bars (90 m from the runway). When a luminous beaconing is activated by bad visibility at the level of this stop bar, it becomes a stop (or "stop bar"). The pilot must systematically come to a brief stop at the level of the stop bars and request authorization from traffic control to proceed.

Within the framework of the present invention, the alert means 9 can emit any type of alert signal upon the detection of a risk of incursion into a prohibited zone Zl, and in particular an audible alert signal or a visual alert signal (of arbitrary type).

In a particular embodiment, said alert means 9 emit a visual alert signal on a standard navigation screen 19, of ND ("Navigation Display") type, as represented in FIG. 3.

In a standard manner, a navigation screen 19 comprises various display modes, namely generally:

- a mode termed "arc", for which the position of the airplane A is illustrated by a symbol 20 which is situated at the bottom of the navigation screen 19, at the center of several circular arcs 21 furnished with heading and distance scales, as represented in FIG. 3. The symbol 20 is fixed and is oriented upwards. The pilot can thus easily pinpoint his airplane A on the map of the airport. The map rotates and slides as a function of the movement of the airplane A, whose symbol 20 therefore remains fixed;
- a mode termed "rose", for which the symbol of the airplane is situated at the center of the navigation screen 19. It is also fixed and is also oriented upwards. Several concentric circles provide reference scales for rapidly and visually measuring the distances and the heading; and
- a mode termed "plan" corresponding to a view from above of the airport, oriented northward. The airplane A moves over this map (which is fixed).

The visual alert signal emitted in accordance with the present invention can be highlighted on the navigation screen 19, whatever the display mode used by this navigation screen 19, be it an arc, rose or plan mode. By way of nonlimiting illustration, characteristics of the present invention have been highlighted on an arc type display mode in FIG. 3.

In addition to the aforesaid elements, the navigation screen 19 also displays a map of the airport comprising for example access linkways 22 and a landing runway 23.

In this case, a visual alert signal can correspond:
to the visual highlighting (different color, thicker plot, flashing plot, etc.) on the navigation screen 19 of the runway 23 on which a risk of incursion has been detected. In FIG. 3, this highlighting is illustrated by thicker contour dashes; and/or
to the display of a textual message 24 in a display rectangle 25 envisaged on said navigation screen 19.

In the latter case, the position on the navigation screen 19 of the display rectangle 25 intended for the textual message 24 depends, preferably, on the display mode (for example a rose, plan or arc mode) existing at the moment of detection of the risk of incursion.

Furthermore, in a particular embodiment, said textual message 24 comprises the name of the corresponding runway, when said prohibited zone Z1 represents a runway zone defined around a landing runway 23. This name comprises two attributes I1 and I2, the position of one of which with respect to the other (I1-I2 or I2-I1) indicates the side of the runway 23 from which the airplane A arrives. This side is determined with the aid of the orientation of the speed vector of the nose 4 of the airplane A and of the orientation which is predetermined of said landing runway 23.

Of course, it can happen that the device 1 detects several risks of runway incursion for the airplane A. In this case, it indicates all the risks of incursion detected, but highlights more particularly the closest risk of incursion, for example by mentioning it first in the corresponding textual message 24.

The invention claimed is:

1. A method for automatically aiding ground navigation of an airplane in an airport, said method comprising:
a) determining current values of a plurality of parameters of said airplane;
b) determining a first position relating to the airplane with the aid of said current values;
c) comparing the first position with at least one prohibited zone; and
d) if said first position is situated in said prohibited zone, emitting at least one alert signal, wherein in step b), a first position is determined which corresponds to an extrapolated position of a nose of said airplane after a particular time interval starting from a current instant, during the ground navigation of said airplane on the airport, and said prohibited zone is a predetermined prohibited zone of the airport.

2. The method as claimed in claim 1, wherein, to determine said first position:
a predetermined reference point of the airplane is taken into account;
in step a), measuring:
a current position of said reference point;
a current speed of said reference point;
a current direction of the airplane; and
a current yaw rate of the airplane; and
in step b:
with aid of the current position of said reference point, of the current direction of the airplane and of a vector offset between the nose of the airplane and said reference point, the current position of the nose of the airplane is determined;
with aid of the current speed of said reference point, of the current yaw rate of the airplane and of the vector offset between the nose of the airplane and said reference point, the current speed of the nose of the airplane is determined; and
with aid of said current position and current speed determined of the nose of the airplane, and said particular time interval, said first position is determined which corresponds to an extrapolated position of the nose of the airplane at the conclusion of said time interval.

3. The method as claimed in claim 2, wherein said reference point corresponds to the location of the airplane where a reception antenna of a satellite-based positioning system is installed.

4. The method as claimed claim 1, wherein in step c), said first position is compared with a plurality of predetermined prohibited zones which are grouped together in a list of prohibited zones.

5. The method as claimed in claim 4, wherein said list of prohibited zones comprises at least one runway zone which corresponds to a surface of the airport, defined around a travelway of said airport.

6. The method as claimed in claim 4, wherein said list of prohibited zones comprises at least one auxiliary zone which corresponds to a surface of the airport, defined around a stop bar of said airport.

7. The method as claimed in claim 2, wherein steps b), c) and d) are implemented only if the current speed of a reference point of the airplane is greater than a first limit speed and less than a second limit speed.

8. The method as claimed claim 1, wherein said particular time interval corresponds:
to a predetermined time interval, if the current speed of a reference point of the airplane is greater than or equal to a third limit speed; and
to a time interval satisfying the expression $T2=(Vs3.T1)/Va$, if said current speed is less than said third limit speed.

9. The method as claimed claim 1, wherein in step d), a visual alert signal is emitted on a navigation screen.

10. The method as claimed in claim 9, wherein said visual alert signal corresponds at least to the highlighting on the navigation screen of a corresponding runway, if said prohibited zone represents a runway zone.

11. The method as claimed in claim 9, wherein said visual alert signal corresponds at least to a textual message which is displayed on said navigation screen.

12. The method as claimed in claim 11, wherein the display zone of said textual message depends on the display mode existing at the moment of the display on said navigation screen.

13. The method as claimed in claim 11, wherein said textual message comprises a name of a corresponding runway, if said prohibited zone represents a runway zone defined around a landing runway, the name comprises two attributes a position of one of which with respect to the other indicates a side of a runway by which the airplane arrives, and side is determined with aid of an orientation of a speed vector of the nose of the airplane and of an orientation of said runway.

14. A device for aiding ground navigation of an airplane in an airport, comprising:
a set of information sources for determining current values of a plurality of parameters of said airplane;

a calculation device to determine, with aid of said current values, a first position relating to the airplane;

a comparison device to compare said first position with a prohibited zone; and an alert device to emit at least one alert signal if said first position is situated in said prohibited zone, wherein the alert device comprises a database which comprises at least one predetermined prohibited zone of the airport, and which is connected to said comparison device, and said calculation device is formed to determine a first position which corresponds to an extrapolated position of the nose of said airplane after a particular time interval starting from a current instant, during the ground navigation of said airplane on the airport.

15. The device as claimed in claim 14, wherein said alert device comprises a cockpit display screen of the airplane.

16. An airplane, comprising a device configured to implement the method of claim 1.

17. An airplane, comprising the device of claim 14.

* * * * *